United States Patent [19]

Sansum

[11] 4,237,377
[45] Dec. 2, 1980

[54] PHOTOELECTRIC LAMP CONTROL WITH SUN-SYNCHRONIZED TIMER

[76] Inventor: Victor H. Sansum, 2518 Webster St., Palo Alto, Calif. 94301

[21] Appl. No.: 41,792

[22] Filed: May 23, 1979

[51] Int. Cl.³ .................................................. H01V 40/14
[52] U.S. Cl. ............................ 250/214 R; 250/214 AL
[58] Field of Search ................... 250/214 R, 214 AL; 315/149, 156, 157, 159

[56] References Cited

U.S. PATENT DOCUMENTS

| | | | |
|---|---|---|---|
| 3,742,221 | 6/1973 | Horner | 315/149 |
| 3,901,813 | 8/1975 | Potopinski | 250/214 AL |
| 4,122,334 | 10/1978 | Owens | 250/214 R |

*Primary Examiner*—David C. Nelms

[57] ABSTRACT

A light-responsive control circuit for the purpose of connecting a load, generally an electric lamp, to an AC source every evening at dusk and disconnecting the load from the AC source later each night at a solar time established by the setting of timepiece-like controls, all without the need for user synchronization of included timekeeping circuitry with the time of day. Starting at dawn each day, a light-responsive switch causes a counter to measure the passage of time by accumulating a count representing one-half hour for each hour that passes, by counting alternations of the AC source voltage. At dusk the count approximately represents the number of hours that have elapsed since solar noon and at that time the light-responsive switch causes the load to be switched on and also causes a signal having a frequency double that of the AC source voltage to be applied to the counter to maintain a correct representation of the solar time of day. When the count reaches a value equal to the number representing the solar time set by the user on the turn-off time switches, a digital comparator causes the load to be disconnected from the AC source.

8 Claims, 3 Drawing Figures

PHOTOELECTRIC LAMP CONTROL WITH SUN-SYNCHRONIZED TIMER

BACKGROUND OF THE INVENTION

Electric lamps for illumination during nighttime hours, if not turned on and off manually, are commonly controlled either by photocells which turn lamps on at dusk and off at dawn, or by 24-hour programmable timers which turn lamps first on, then off, at designated times each night.

A first object of this invention is to incorporate within a single light-responsive control circuit the on-at-dusk feature of conventional photoelectric controls and the off-at-a-selectable-time capability of conventional timers, while avoiding the following usually undesirable properties of these two types of controls: Conventional photoelectric controls keep lamps switched on until dawn. Conventional 24-hour programmable timers used for lamp control need periodic resetting of turn-on time in accordance with seasonal changes in the occurrence of dusk.

A second object of this invention is to incorporate within said light-responsive control circuit means whereby the included timekeeping circuit is synchronized each day with the time of day, so that, in the event of failure of the electrical power source, synchronization error resulting from such an outage will not last beyond the night following the termination of the outage. This feature is particularly useful in applications where restoration of correct timing by human intervention is not convenient, as in homes of people away on vacation, or where battery backup is inconvenient and/or expensive.

The timekeeping circuitry within this invention is synchronized with solar time by illumination from the sun. The hour and minute designations of the positions of the switches which constitute the turn-off time controlling means, therefore, refer to solar time.

A portion of any discrepancy between the observed turn-off time according to standard time and the turn-off time set on the turn-off time controlling means of this invention is constant and therefore may be allowed for in setting the desired turn-off time. Much of this constant discrepancy is due to the difference between mean solar time and standard time. Standard time is coincident with mean solar time only at certain geographical locations, generally along standard meridians. Some few minutes of any apparent discrepancy between the turn-off time set on the turn-off time controlling means and the observed turn-off time according to standard time may be due to causes which vary on a daily or seasonal basis. Discrepancy between successive days is due primarily to variations in cloudiness, haze, etc. Seasonal variations are caused by the fact that solar time differs from mean solar time by an amount which varies from zero to almost 16 minutes, depending on the inclination of the earth's axis and the speed of the earth's motion in its orbit around the sun. However, the few minutes of variable discrepancies just enumerated may be an asset. Slight variability in the turn-off times of automatically controlled lamps in unoccupied homes may more nearly duplicate human behavior patterns than timers programmed to switch lamps off at unvarying times each night.

SUMMARY OF THE INVENTION

A light-responsive switch, consisting of a photocell exposed to light from the sky, biasing resistors, voltage comparator, logic level inverter, and low-pass filter, produces a first output which is a logic low during the day and a logic high at night, and a second output which is a logic low during the day and a logic high at night, and a second output which is a logic high during the day and a logic low during the night. At dawn each day, the light-responsive switch causes a latch, whose two possible states are here designated COUNT and RESET to describe the effect of the latch upon a counter controlled by the latch, to switch from its RESET state to its COUNT state. (A capacitor connected to one side of this latch causes the latch momentarily to favour the RESET state when the latch is energized.) When the latch switches to its COUNT state, the counter starts counting. Between dawn and dusk, the low state of said first output of the light-responsive switch causes a pulse-generating circuit to drive the counter with a 60 Hz pulse train derived from the AC source. After dusk, the light-responsive switch causes the pulse-generating circuit to drive the counter with a 120 Hz pulse train also derived from the AC source. the 120 Hz input to the counter causes the count in the latter stages of the counter, said latter stages of the counter constituting the outputs of the counter, to proceed at a rate representing the passage of hours and fractions of hours. Daytime counting is at half this rate so that the states of the counter at dusk represent half the number of hours that have elapsed between dawn and dusk. Since solar noon occurs midway between sunrise and sunset, the states of the counter at dusk closely represent the number of hours that have elapsed since solar noon. That is, at dusk the states of the counter represent the time of day (solar time). Said outputs of the counter are applied to one set of inputs of a digital comparator. The outputs of an encoder, which convert the settings of the switches constituting the turn-off time controlling means into the same type of binary code presented by the counter, are applied to the other set of inputs of the digital comparator. After dusk, said latch is still in its COUNT state. That fact and the low state of said second output of the light-responsive switch cause the load, usually a lamp, to be switched on. After dusk the counter is driven at 120 Hz so that the digital number defined by the states of the counter at dusk is augmented by a quantity, which at any moment, defines the number of whole and fractional hours of time which have elapsed since dusk. When the digital comparator detects equality between the states of the outputs of the counter and the states of the encoder outputs, a signal to this effect from the digital comparator is applied to the latch, causing it to switch to its RESET state. This latch, in switching to its RESET state, causes the load to be switched off and the counter to be reset to zero. This reset condition is maintained until illumination of the light-responsive switch indicates the occurrence of dawn, at which time another count begins.

A false-dawn detection and correction circuit has been included to switch the latch to its RESET state and consequently to reset the counter, if a flash of light during the night (at least an hour before dawn) should initiate counting as if dawn had occurred. After one hour of counting in darkness or after two hours of counting with the photocell subjected to illumination, a signal is produced by the counter which switches the latch to its RESET state and consequently resets the counter, unless inhibited by a signal from the light-responsive switch indicating the occurrence of daytime. After a dark-to-light transition has initiated counting, a gate circuit prevents a subsequent occurrence of darkness from causing the load to be switched on for a period of one hour following the start of counting if the photocell is in darkness or a period of two hours if the photocell is illuminated.

An energy-storage capacitor, isolated by a diode from non-memory circuit elements conducting significant amounts of current, is included at an output of the included DC supply to maintain supply voltage to the latch and counter during brief intervals of failure of the AC source.

DETAILED DESCRIPTION

Figure 1A:
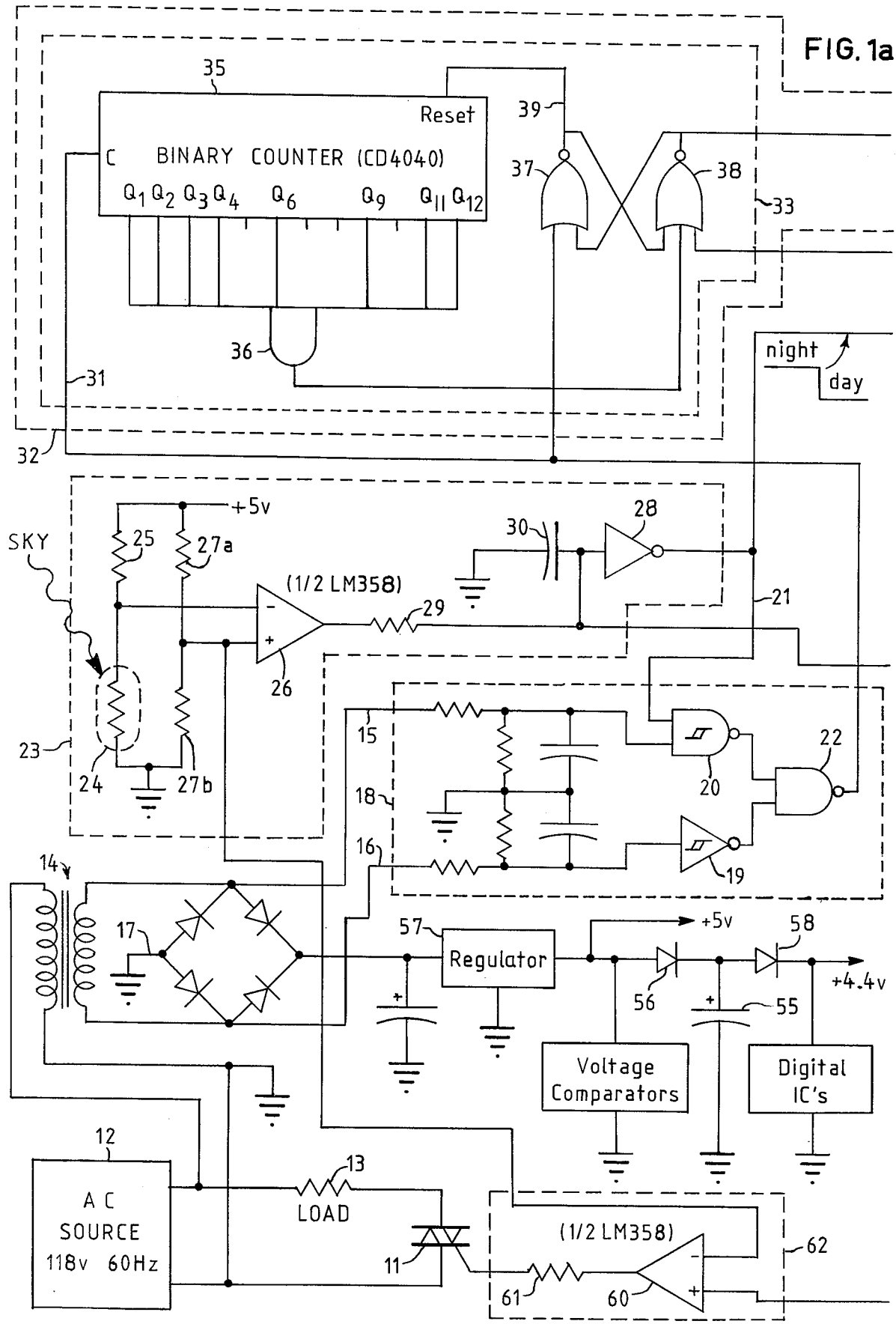
FIG. 1 is a circuit diagram of a light-responsive control circuit embodying this invention in which the circuit diagram is divided, as shown, into FIG. 1a, the left portion, and FIG. 1b, the right portion.
Figure 1B:
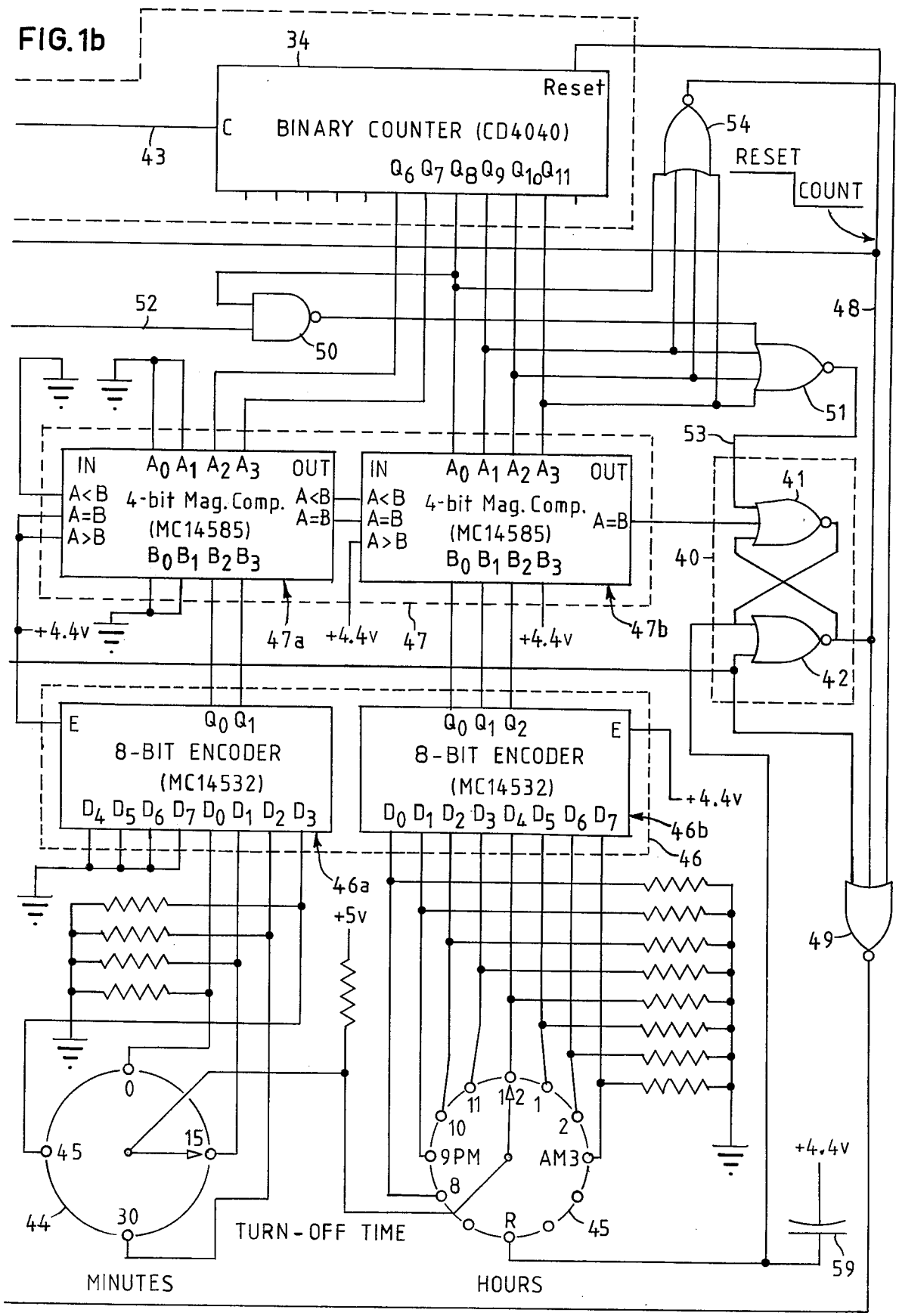
Figure 2:
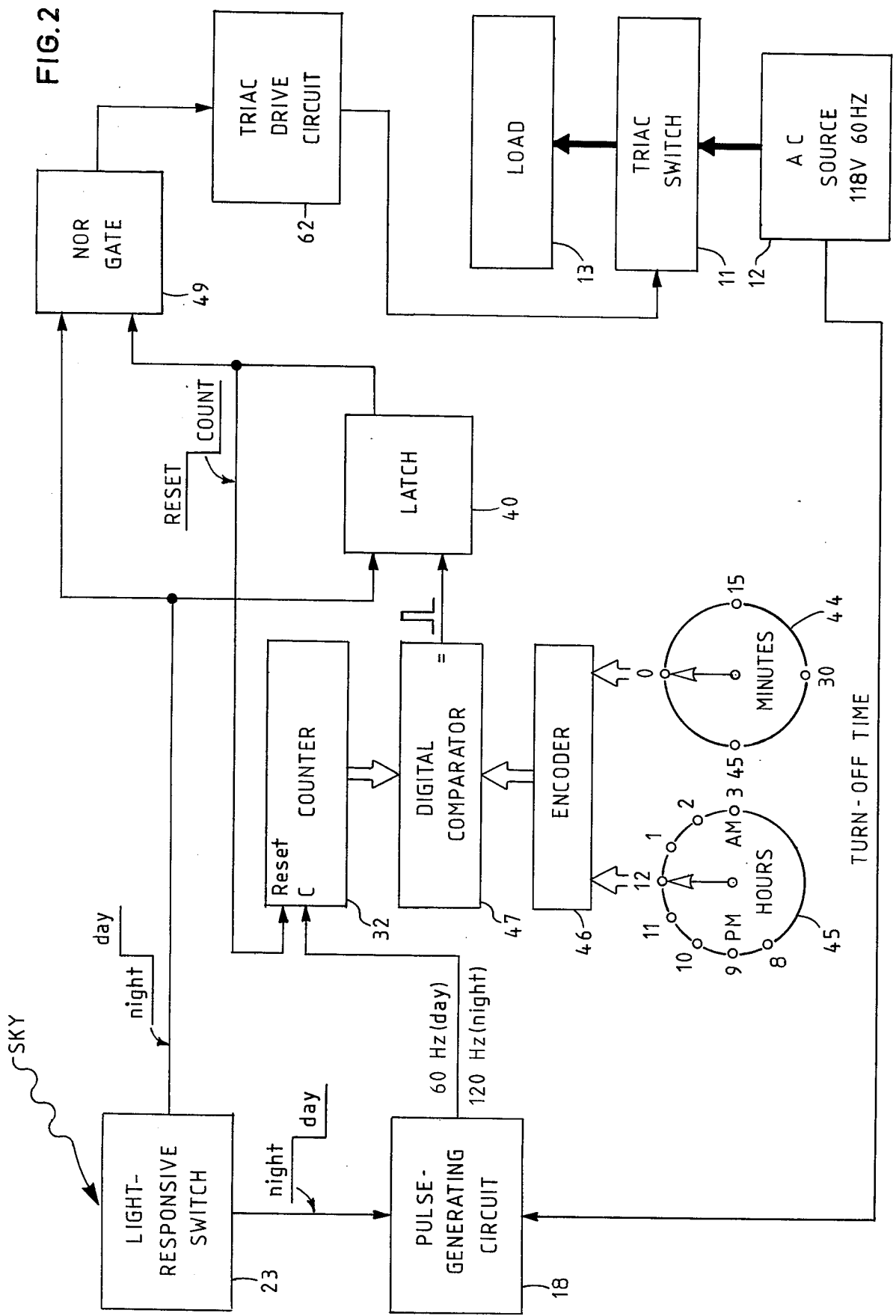
FIG. 2 is a block diagram of the light-responsive control circuit shown in FIG. 1 except that the false-dawn detection and correction circuit and the capacitive energy-storage means are not shown or referred to therein. Identifying numerals used in FIG. 2 are the same numerals used for like elements in FIG. 1.

A switch, illustrated in FIG. 1 and FIG. 2 as a triac switch 11, controls the flow of current from an electrical power source, illustrated in FIG. 1 and FIG. 2 as 118 volts, 60 Hertz, alternating current source 12, to a load 13, which usually consists of one or more electric lamps.

Step-down transformer 14 provides power from the AC source 12 for the circuitry which controls said triac switch 11. Step-down transformer 14 also provides, on conductors 15 and 16, and with respect to circuit ground 17, two 60 Hz pulse trains, each consisting of half-wave rectified AC voltage. Said two 60 Hz pulse trains, differing in phase by 180 degrees, are applied as inputs to pulse-generating circuit 18. Included in pulse-generating circuit 18 are Schmitt trigger inverter 19 which serves to shape the pulses present on line 16, NAND Schmitt trigger 20 which serves to shape pulses present on line 15 and to block the transmission of these pulses if its second input 21 is a logic low, and NAND gate 22 which combines the outputs of Schmitt trigger inverter 19 and NAND Schmitt trigger 20. Said logic low at said second input 21 of NAND Schmitt trigger 20 occurs when the output of light-responsive switch 23, which drives said second input 21 of NAND Schmitt trigger 20, is low as a result of illumination of photocell 24.

Said light-responsive switch 23 consists of photocell 24, series resistor 25 connected to the 5 volt DC supply, voltage comparator 26, resistive voltage divider 27a and 27b connected to said 5 volts DC supply, logic level inverter 28, and a low-pass filter composed of resistor 29 and capacitor 30. The output of NAND gate 22, as a result, is 60 Hz during the day when the photocell 24 is exposed to daylight and 120 Hz at night when said photocell 24 is in darkness. Said low-pass filter prevents a transient on excursion of the output of voltage comparator 26, caused by the turning on or off of said 5 volts DC supply, from affecting circuitry controlled by voltage comparator 26.

The pulse train at the output of NAND gate 22 is applied to the count input 31 of the counter 32. This counter 32 consists of counter subcircuit 33 and binary counter 34. As well as a count input 31, a counter reset means is included in counter 32 which permits an applied logic signal to force the binary count-down stages of counter 32 to assume their zero states. Counter subcircuit 33 consists of 12-stage binary counter 35, 8-input AND gate 36, NOR gate 37 and NOR gate 38. Counter subcircuit 33 divides the input frequency by a factor of 3375, producing an output of 64 pulses per hour for an input of 60 Hz and 128 pulses per hour for an input of 120 Hz. This frequency division by counter subcircuit 33 is achieved by the detection of a count which is the binary equivalent of 3375, occurring on the outputs of a binary counter 35. This count detection occurs when the count input 31 of binary counter 35 is subjected to a negative-going voltage transition for the 3375th time after the start of counting by binary counter 35, at which time all outputs of binary counter 35 connected to inputs of AND gate 36 are in a logic high state or change to a logic high state, thereby causing the output of AND gate 36 to switch to a high state. The switching of AND gate 36 output to a high state causes NOR gate 38 to switch to a logic low and NOR gate 37 to switch to a logic high. NOR gates 37 and 38 are cross-coupled to perform a latching function. This logic high at the output of NOR gate 37, applied to the reset input 39 of binary counter 35, initiates the setting of binary counter 35 to a count of zero. Binary counter 35 remains with a logic high from the output of NOR gate 37 applied to its reset input 39 for one-half cycle of the pulse train applied to the count input 31 of binary counter 35 and to NOR gate 37, thereby permitting all twelve stages of binary counter 35 to be reliably reset to zero. At the end of said one-half cycle of the pulse train, the subsequent positive-going excursion of the voltage at the output of NAND gate 22 changes the states of NOR gates 37 and 38, thereby removing said logic high from reset input 39 of binary counter 35. Counting by binary counter 35 begins anew with the next negative-going excursion of the pulse train at count input 31 of binary counter 35.

The output of counter subcircuit 33, 64 pulses per hour during the day and 128 pulses per hour after dusk, is applied to binary counter 34 of which the first eleven stages of binary count-down are used in the particular embodiment of this invention herein described. Counter 32 is controlled by latch 40 consisting of NOR gates 41 and 42. Latch 40 is here defined as being in its COUNT state when the output of NOR gate 42 is a logic low and in its RESET state when the output of NOR gate 42 is a logic high. A RESET signal from latch 40 causes binary counter 34 and binary counter 35 to assume their reset states. When latch 40 is caused to switch to its COUNT state, counter 32 begins counting. When the signal applied via conductor 43 to the count input of binary counter 34 is a pulse train having a frequencey of 128 pulses per hour, then at its sixth stage output Q6, the frequency is two pulses per hour, so that this sixth stage switches states every fifteen minutes. Similarly, the seventh stage output Q7 switches every 30 minutes, the eighth stage switches states every hour, and the ninth, tenth, and eleventh stages switch states every two, four, and eight hours, respectively.

The desired turn-off time, designated by the positions of switches 44 and 45, together constituting the turn-off time controlling means in this embodiment of this invention, is converted into binary code by encoder 46 which consists of 8-bit encoder 46a and 8-bit encoder 46b. TABLE 1 describes the logical operations performed by 8-bit encoders 46a and 46b. The outputs of encoder 46 are compared with outputs of binary counter 34 by digital comparator 47. Digital comparator 47 is composed of 4-bit magnitude comparators 47a and 47b. TABLE 2 describes the logical operations performed by 4-bit magnitude comparators 47a and 47b. The hours switch 45 connects a logic high level to one of the eight inputs of the 8bit encoder 46b. The outputs of said 8-bit encoder 46b constitute a 3-bit number having a value between zero and seven in agreement with the setting of switch 45. This 3-bit number is compared to the binary values in the eighth, ninth, and tenth stages of binary counter 34 by 4-bit magnitude comparator 47b. At the same time, the eleventh stage output Q11 of binary counter 34 is compared with a constantly-applied logic high at input B3 of 4-bit magnitude comparator 47b. Since the 3-bit number at the outputs of the eighth, ninth, and tenth stages of binary counter 34 represents a count in hours (for an input frequency of 120 Hz), and is compared with the 3-bit number representing the position of switch 45, the position of switch 45 represents hours in excess of the eight (for an input frequency of 120 Hz) decreed by output Q11 of the eleventh stage of binary counter 34 being compared with a logic high. Thus eight hours is the shortest timing interval that can result in the output of an equality signal from 4-bit magnitude comparator 47b and occurs only when all outputs from encoder 46 are zero. 8-bit encoder 46b produces outputs of zeros when 8-bit encoder 46b input DO is a logic high. The position of switch 45 that connects a logic high to input DO of 8-bit encoder 46b is labeled "8". Switch 45 positions subsequent to switch 45 position "8" are labeled in ascending numbers of hours greater than eight and are connected to 8-bit encoder 46b inputs D1 through D7 to produce timing intervals lengthened in excess of eight hours by one hour increments. Switch 44 establishes the desired number of ¼ hour segments that are added to the length of the timing interval established by switch 45. Switch 44, as shown, makes possible a choice between zero, one, two, or three such segments. The logic high occurring on one of the four conductors joining the four contacts of switch 44 to four of the inputs of 8-bit encoder 46a, is converted into a 2-bit number by 8-bit encoder 46a. The outputs of the sixth and seventh stages of binary counter 34, which change states every ¼ and ½ hour respectively (for an input frequency of 120 Hz), are compared with the two bits of said 2-bit number by 4-bit magnitude comparator 47a. Before an equality condition is signalled by 4-bit magnitude comparator 47b, 4-bit magnitude comparator 47a must transmit an equality condition to 4-bit magnitude comparator 47b as described in TABLE 2. When digital comparator 47 does apply an equality signal to latch 40, then latch 40 switches to its RESET state. The logic high thus applied to conductor 48 causes, through NOR gate 49 and a power switching means, the cessation of current flow through load 13. Said power switching means consists of triac switch 11 and a triac drive circuit 62. Said triac drive circuit 62 here consists of voltage comparator 60 and current-limiting resistor 61. The logic high on conductor 48 also causes binary counters 34 and 35 to reset to zero. Latch 40 remains in its RESET state from turn-off time until dawn, when a positive output signal from light-responsive switch 23 switches latch 40 to its COUNT state. Binary counters 34 and 35 then have reset signals removed and counting ensues.

Should a user inadvertently subject this invention to illumination at night, the user, after the return of darkness, may force latch 40 to assume its RESET state by momentarily switching the wiper of switch 45 to the "R" contact of switch 45. If lightning or other momentary light should illuminate photocell 24 during the night and not be negated later by the user setting switch 45 momentarily to the "R" position, then NAND gate 50, NOR gate 51, and NOR gate 54 form a false-dawn detection and correction circuit which, if the lightning or other momentary light occurs during the interval between turn-off time and approximately one hour (exactly one hour if the illumination is a single impulse of light) before dawn, switches latch 40 to its RESET state and consequently resets binary counters 34 and 35 to zero. This false-dawn detection and correction begins when dawn or other light illuminates the photocell 24, causing latch 40 to switch to its COUNT state and consequently initiating counting by counter 32 as described above. After counting for a short time interval (one to two hours, depending on whether the pulse-generating circuit puts out 60 Hz or 120 Hz pulses), a logic high occurs at output Q8 of binary counter 34. This logic high at output Q8 of binary counter 34, if coincident with the occurrence of darkness and consequently coincident with a logic high on conductor 52, causes a logic low to occur at the output of NAND gate 50. This logic low at the output of NAND gate 50 is presented to NOR gate 51 along with outputs from the remaining stages of binary counter 34. If said outputs from the remaining stages of binary counter 34 are all in a low state, indicating that binary counter 34 has not been counting for an interval longer than said short time interval, then the logic low from the output of NAND gate 50 present at the input of NOR gate 51, causes a logic high to occur on conductor 53 which switches latch 40 to its RESET state, and consequently resets binary counters 34 and 35 to zero. However, if the photocell 24 is illuminated at the time binary counter 34 output Q8 switches to a logic high, then a logic high will remain at the output of NAND gate 50, latch 40 will not be switched to its RESET state, and the count will continue.

During said short time interval after the initiation of counting, NOR gate 54 prevents a return to darkness from causing load 13 to be energized. After the start of counting, since the inputs of NOR gate 54, which are the outputs Q8, Q9, Q10, and Q11 of binary counter 34, are logic low, NOR gate 54 applies a logic high to NOR gate 49, and consequently holds load 13 de-energized. As stated above, said short time interval ends when output Q8 of binary counter 34 switches to a logic high. Also governed by the state of output Q8 of binary counter 34, the output of NOR gate 54 switches to a logic low when output Q8 of binary counter 34 switches to a logic high, and since, for the remainder of the count, at least one of the outputs Q8, Q9, Q10, and Q11 will be a logic high, the output of NOR gate 54 will be a logic low and thus will not inhibit the energizing of load 13 at the onset of darkness following the cessation of said short time interval.

In the event of a brief failure of the AC supply, the voltage required to prevent loss of the count and loss of the state of latch 40 is provided by the charge on energy-storage capacitor 55. During a loss of AC power, diode 56 prevents charge on capacitor 55 from discharging through regulator 57 or through other circuit elements connected to the output of regulator 57. For instances where capacitors connected to the inputs of logic elements may be electrically charged while DC power for the logic elements is absent, diode 58 impedes discharge of said capacitors, thereby negating the possibility of consequent damage to such logic elements.

Capacitor 59 couples the turn-on voltage excursion of the 4.4 volts DC supply to latch 40 to insure that, when energized, latch 40 will assume its RESET state if not forced to assume its COUNT state by a logic high input signal from the light-responsive switch 23.

TABLE 1

TRUTH TABLE FOR 8-BIT ENCODER
(8-BIT PRIORITY ENCODER MC14532B)

| INPUT | | | | | | | | | OUTPUT | | |
|---|---|---|---|---|---|---|---|---|---|---|---|
| E | D7 | D6 | D5 | D4 | D3 | D2 | D1 | D0 | Q2 | Q1 | Q0 |
| 0 | X | X | X | X | X | X | X | X | 0 | 0 | 0 |
| 1 | 0 | 0 | 0 | 0 | 0 | 0 | 0 | 0 | 0 | 0 | 0 |
| 1 | 1 | X | X | X | X | X | X | X | 1 | 1 | 1 |
| 1 | 0 | 1 | X | X | X | X | X | X | 1 | 1 | 0 |
| 1 | 0 | 0 | 1 | X | X | X | X | X | 1 | 0 | 1 |
| 1 | 0 | 0 | 0 | 1 | X | X | X | X | 1 | 0 | 0 |
| 1 | 0 | 0 | 0 | 0 | 1 | X | X | X | 0 | 1 | 1 |
| 1 | 0 | 0 | 0 | 0 | 0 | 1 | X | X | 0 | 1 | 0 |
| 1 | 0 | 0 | 0 | 0 | 0 | 0 | 1 | X | 0 | 0 | 1 |
| 1 | 0 | 0 | 0 | 0 | 0 | 0 | 0 | 1 | 0 | 0 | 0 |

X = DON'T CARE

TABLE 2

TRUTH TABLE FOR 4-BIT MAGNITUDE COMPARATOR (MC14585B)

| INPUTS (COMPARING) | | | | INPUTS (CASCADING) | | | OUTPUTS | | |
|---|---|---|---|---|---|---|---|---|---|
| A3,B3 | A2,B2 | A1,B1 | A0,B0 | A<B | A=B | A>B | A<B | A=B | A>B |
| A3>B3 | X | X | X | X | X | 1 | 0 | 0 | 1 |
| A3=B3 | A2>B2 | X | X | X | X | 1 | 0 | 0 | 1 |
| A3=B3 | A2=B2 | A1>B1 | X | X | X | 1 | 0 | 0 | 1 |
| A3=B3 | A2=B2 | A1=B1 | A0>B0 | X | X | 1 | 0 | 0 | 1 |
| A3=B3 | A2=B2 | A1=B1 | A0=B0 | 0 | 0 | 1 | 0 | 0 | 1 |
| A3=B3 | A2=B2 | A1=B1 | A0=B0 | 0 | 1 | 1 | 0 | 1 | 0 |
| A3=B3 | A2=B2 | A1=B1 | A0=B0 | 1 | 0 | 1 | 1 | 0 | 0 |
| A3=B3 | A2=B2 | A1=B1 | A0<B0 | X | X | X | 1 | 0 | 0 |
| A3=B3 | A2=B2 | A1<B1 | X | X | X | X | 1 | 0 | 0 |
| A3=B3 | A2<B2 | X | X | X | X | X | 1 | 0 | 0 |
| A3<B3 | X | X | X | X | X | X | 1 | 0 | 0 |

X = DON'T CARE

The logic circuits used in this invention were chosen from the CMOS (Complementary symmetry metal-oxide-semiconductor) family of integrated circuits because of availability and to minimize power consumption. Exemplary industry part numbers are shown in FIG. 1 for the voltage comparators and all digital logic circuits other than simple logic gates. Alternatively, all logic required for this invention could be included in a single integrated circuit.

I claim:
1. A light-responsive control circuit comprising
 a light-responsive switch which distinguishes daytime from nighttime by representing the light intensity of the daytime sky and the relatively low light intensity of the nighttime sky as binary voltage levels,
 a pulse-generating circuit whose output is a train of pulses having a first fixed frequency when said light-responsive switch signals the occurrence of daytime and whose output is a train of pulses having a second fixed frequency, said second fixed frequency being twice the frequency of said first fixed frequency, when said light-responsive switch signals the occurrence of nighttime,
 a turn-off time controlling means which is settable by a user to a solar time of night, at which turn-off time every night a load is to be disconnected from an electrical power source, whose output is an electrical representation of said turn-off time,
 an encoder which has an input the output of said turn-off time controlling means and produces an output, the turn-off time setting, which is a set of electrical states presenting the settings of said turn-off time controlling means as a digital number,
 a counter that counts the number of pulses emanating from said pulse-generating circuit between the time said light-responsive switch signals the occurrence of dawn and said turn-off time set on said turn-off time controlling means, such that, when said turn-off time set on said turn-off time controlling means occurs, the states of the latter stages of said counter, said latter stages constituting the outputs of said counter, constitute a digital number equal to said turn-off time setting,
 a counter reset means which enables said counter to count from zero beginning when said light-responsive switch signals the arrival of dawn,
 a comparator which signals the occurrence of said turn-off time when said outputs of said counter become equal to said turn-off time setting,
 a latch for controlling said counter by allowing counting by said counter between the occurrence of a dawn signal from said light-responsive switch and the occurrence of a signal from said digital comparator indicating the occurrence of said turn-off time, and for maintaining said counter in a reset state between the occurrence of said turn-off time signalled by said digital comparator and the occurrence of a dawn signal from said light-responsive switch,
 a first gate circuit which monitors the state of said latch and the state of said light-responsive switch, so that, when said light-responsive switch indicates the occurrence of darkness, and at the same time said latch indicates the counter is counting, then the output of said first gate circuit constitutes a signal commanding that said load be connected to said electrical power source, and
 a power switching means which, in response to said signal from said first gate circuit, connects said electrical power source to said load.
2. The light-responsive control circuit as claimed in claim 1 wherein said pulse-generating circuit consists of means for deriving the required two pulse trains from an AC source wherein one pulse train has a repetition rate equal to the frequency of said AC source.

3. The light-responsive control circuit defined in claim 1 and further including an energy-storage capacitor for powering both said counter and said latch during brief failures of said electrical power source, said capacitor being isolated from circuit elements normally consuming significant amounts of power by a diode maintaining unidirectional current flow from the DC supply into said energy-storage capacitor, said counter, said latch, and other circuit elements consuming insignificant amounts of power.

4. The light-responsive control circuit defined in claim 1 further including a false-dawn detection and correction circuit consisting of
   a second gate circuit that monitors an output of said counter and also an output of said light-responsive switch so as to produce an output signal at the end of a short time interval following the beginning of counting, said short time interval being a fraction of the interval between dawn and dusk, but producing no output signal if said light-responsive switch does not signal the occurrence of darkness,
   a third gate circuit that monitors the output of said second gate circuit and outputs of all stages of said counter subsequent to the stage of said counter whose output is monitored by said second gate circuit, so that said third gate circuit switches said latch to that state which causes said counter to switch to a reset state when said output signal from said second gate circuit coincides with the occurrence of a reset state at the output of each stage of said counter subsequent to said stage whose output is monitored by said second gate circuit, and
   a fourth gate circuit which causes said load to remain disconnected from said electrical power source for an interval after a count-initiating dark-to-light transition, equal in length to the interval between said count-initiating dark-to-light transition and said end of said short time interval following the beginning of counting.

5. The light-responsive control circuit defined in claim 1 and further including a capacitor connected to one side of said latch in a manner to favour the setting to zero of said counter when the connection of an electrical power source to this invention causes said latch to be energized.

6. A light-responsive control circuit comprising
   a light-responsive switch which signals the occurrences of daytime and nighttime by presenting to subsequent circuitry, binary electrical levels representing daytime and nighttime,
   a pulse-generating circuit for producing electrical timing pulses,
   a turn-off time controlling means which is settable by a user to a time of night at which turn-off time every night a load is to be disconnected from an electrical power source, whose output is an electrical representation of said turn-off time,
   an encoder which has as input the output of said turn-off time controlling means and produces an output, the turn-off time setting, which is a set of electrical states presenting the settings of said turn-off time controlling means as a digital number,
   a counter that counts the number of pulses emanating from said pulse-generating circuit, such that, when said turn-off time set on said turn-off time controlling means occurs, the states of the latter stages of said counter, said latter stages constituting the outputs of said counter, constitute a digital number equal to said turn-off time setting,
   a comparator which signals the occurrence of said turn-off time when said outputs of said counter become equal to said turn-off time setting,
   a latch, which in response to said comparator and said light-responsive switch, maintains a signal designating said load is to remain unenergized between said turn-off time and dawn,
   a first gate circuit which monitors the state of said latch and the state of said light-responsive switch, whose output constitutes a signal requiring said load to remain energized except when said light-responsive switch indicates the occurrence of daytime or when said latch signals that said load is to remain unenergized, and
   a power switching means which, in response to said signal from said first gate circuit, maintains current flow from said electrical power source through said load.

7. The light-responsive control circuit defined in claim 6 wherein said pulse-generating circuit consists of means for deriving said electrical timing pulses from the alternations of the voltage of said electrical power source when said electrical power source is an AC source.

8. The light-responsive control circuit defined in claim 6 and further including an energy-storage capacitor for powering said counter and said latch during brief failures of said electrical power source, wherein said capacitor is isolated by a diode from non-memory circuit elements normally conducting relatively large currents such that said diode maintains unidirectional current flow from the DC power supply into said energy-storage capacitor as well as through said counter, said latch, and other circuit elements through which flow currents of similarly small magnitudes as those through said counter and said latch.

* * * * *